(12) United States Patent
Sherman

(10) Patent No.: US 6,979,012 B2
(45) Date of Patent: Dec. 27, 2005

(54) FOLDABLE BICYCLE FRAME WITH AXIAL REAR WHEEL REMOVAL

(76) Inventor: Aleksandr Sherman, 4038 Surf Ave., Brooklyn, NY (US) 11224

(*) Notice: Subject to any disclaimer, the term of this patent is extended or adjusted under 35 U.S.C. 154(b) by 19 days.

(21) Appl. No.: 10/816,632

(22) Filed: Apr. 2, 2004

(65) Prior Publication Data

US 2005/0218624 A1   Oct. 6, 2005

(51) Int. Cl.[7] .............................................. B62K 15/00
(52) U.S. Cl. ....................................... 280/278; 280/288
(58) Field of Search ................................ 280/278, 288

(56) References Cited

U.S. PATENT DOCUMENTS 5,474,318 A * 12/1995 Castellano .................. 280/284
6,279,935 B1 * 8/2001 Wagner ...................... 280/287

* cited by examiner

*Primary Examiner*—Lesley D. Morris
*Assistant Examiner*—Matthew Luby
(74) *Attorney, Agent, or Firm*—Kirschstein, et al.

(57) ABSTRACT

A rear wheel is axially removable from a bicycle frame after a support arm is pivoted away from an initial position overlying the rear wheel. A bicycle drive mechanism is not removed together with the rear wheel, but instead, is left mounted on another support arm. Both support arms straddle the rear wheel during bicycle use and are pivotable to fold the bicycle for compact storage.

17 Claims, 4 Drawing Sheets

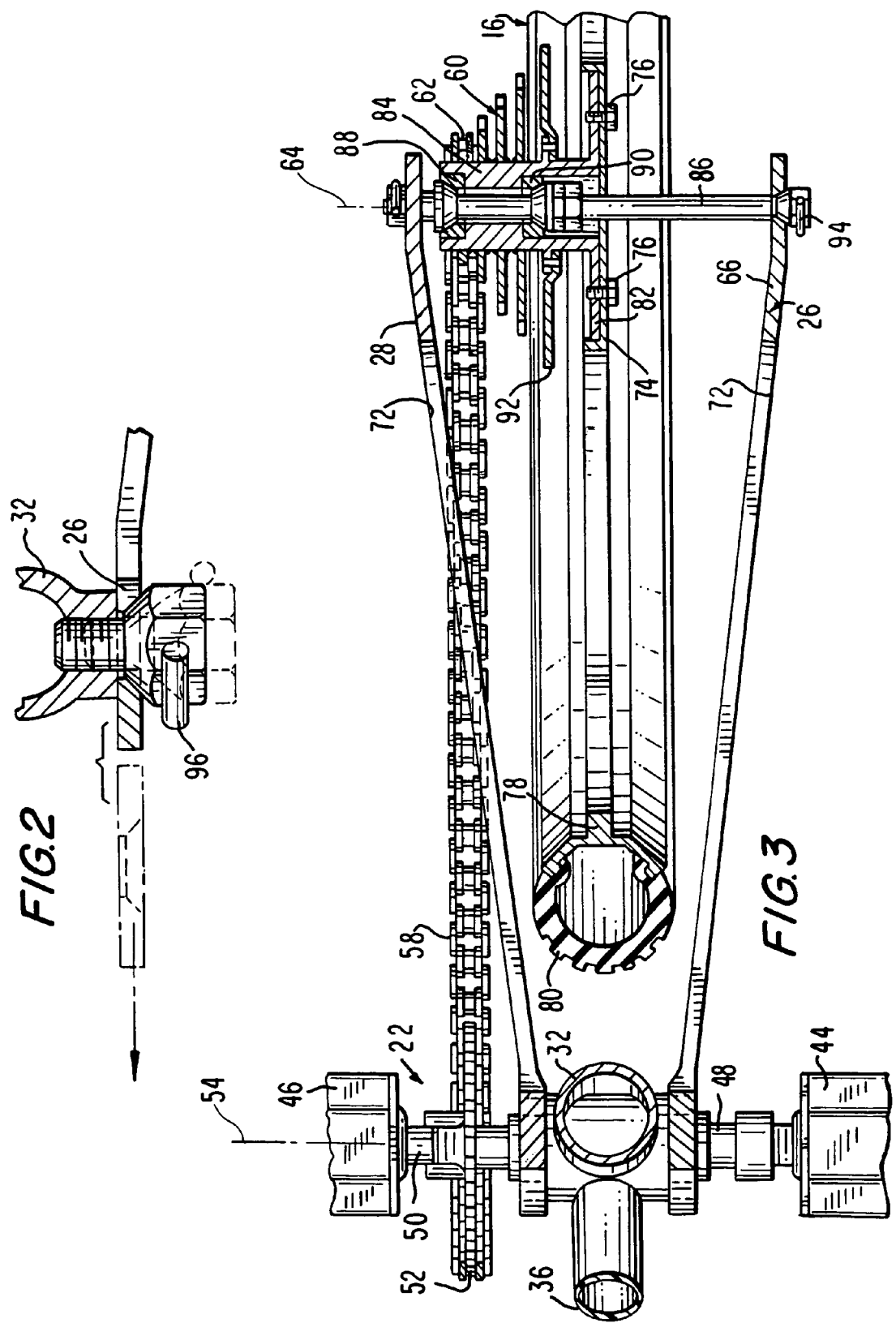

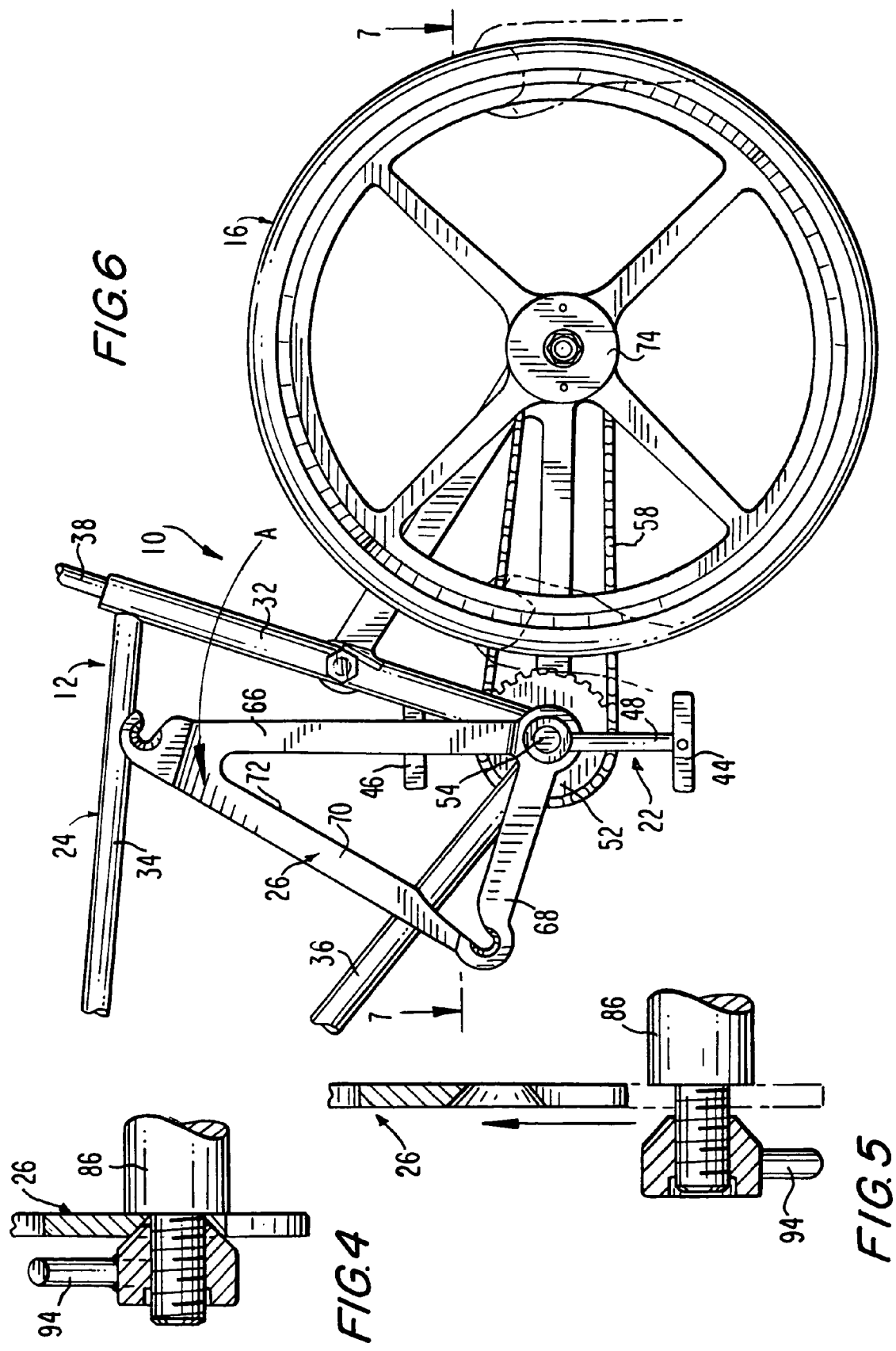

FOLDABLE BICYCLE FRAME WITH AXIAL REAR WHEEL REMOVAL

BACKGROUND OF THE INVENTION

1. Field of the Invention

The present invention generally relates to bicycles and, more particularly, to bicycle frames which are foldable to occupy less storage space, and which enable quick and easy removal of rear bicycle wheels for replacement or repair.

2. Description of the Related Art

Folding bicycles, whether driven by foot pedaling and/or whether assisted by a motor drive, are well known to conserve storage space when the bicycles are not being ridden. Although generally satisfactory for their intended purpose, the known bicycles are foldable about an axis other than the pedal axis and, hence, occupy more storage space than necessary.

Another problem with bicycles, whether foldable or not, is wheel maintenance, especially the rear wheel on which a drive mechanism is conventionally mounted. It is often laborious to change a flat rear wheel tire due to the presence of the drive mechanism which conventionally includes a gear changer and a braking assembly.

SUMMARY OF THE INVENTION

Objects of the Invention

One object of this invention is to enable rapid removal of, and easy access to, a rear wheel of a bicycle to effect repairs or replacement.

Another object of this invention is to enable removal of the rear wheel without also removing the drive mechanism.

Still another object of this invention is to fold the bicycle for minimum storage space about the pedal axis.

Yet another object of this invention is to enable the front and rear wheels to be identical for easier replacement and maintenance.

FEATURES OF THE INVENTION

In keeping with these objects and others which will become apparent hereinafter, one feature of this invention resides, briefly stated, in a frame for a bicycle in which a front wheel is mounted on a main frame support, and a rear wheel is mounted by at least one frame support arm, or by a pair of frame support arms, on the main frame support. The arms straddle and support the rear wheel in a use position for rotation about a rear wheel axis during bicycle motion.

In accordance with one aspect of this invention, at least one of the arms is movable to enable movement of the rear wheel away from the use position when the bicycle is not in motion. Preferably, the movable arm is pivotably mounted on the main frame support about a pivot axis parallel to the rear wheel axis. In the preferred embodiment, the pivot axis is coincident with a pedal axis about which a foot pedal drive assembly is rotated when the bicycle is in motion.

Upon pivoting the movable arm out of its initial straddling position at one side of the rear wheel, the rear wheel is removed in a direction axially of the rear wheel axis in a manner not unlike the axial removal of an automobile tire from an automobile. This axial removal has heretofore not been achieved for bicycle wheel maintenance.

Another aspect of this invention relates to the mounting of a bicycle drive mechanism on the other of the arms. The drive mechanism typically includes a gear changer and a brake assembly, and these components are conventionally mounted on the rear wheel for joint movement therewith, thereby complicating rear wheel maintenance. In accordance with this invention, the drive mechanism is not jointly mounted on the rear wheel, and hence, the rear wheel can be removed from the bicycle while leaving the drive mechanism in place on the other arm.

Each arm may be independently pivotably mounted on the main frame support, and both arms may be simultaneously pivotable to reposition the rear wheel from its initial use position in which the rear wheel is directly behind the front wheel, to a folded-up position in which the rear wheel is elevated relative to the front wheel to achieve compact storage. By pivoting both arms about the foot pedal axis, a particularly compact storage space is obtained.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a broken-away, enlarged, sectional view taken on line 2—2 of FIG. 1;

FIG. 3 is a broken-away view taken on line 3—3 of FIG. 1;

FIG. 4 is a sectional view taken on line 4—4 of FIG. 1;

FIG. 5 is a view similar to FIG. 4, but during rear wheel movement;

FIG. 6 is a view of the rear of the bicycle of FIG. 1 during rear wheel movement;

DETAILED DESCRIPTION OF THE PREFERRED EMBODIMENTS

Figure 1:
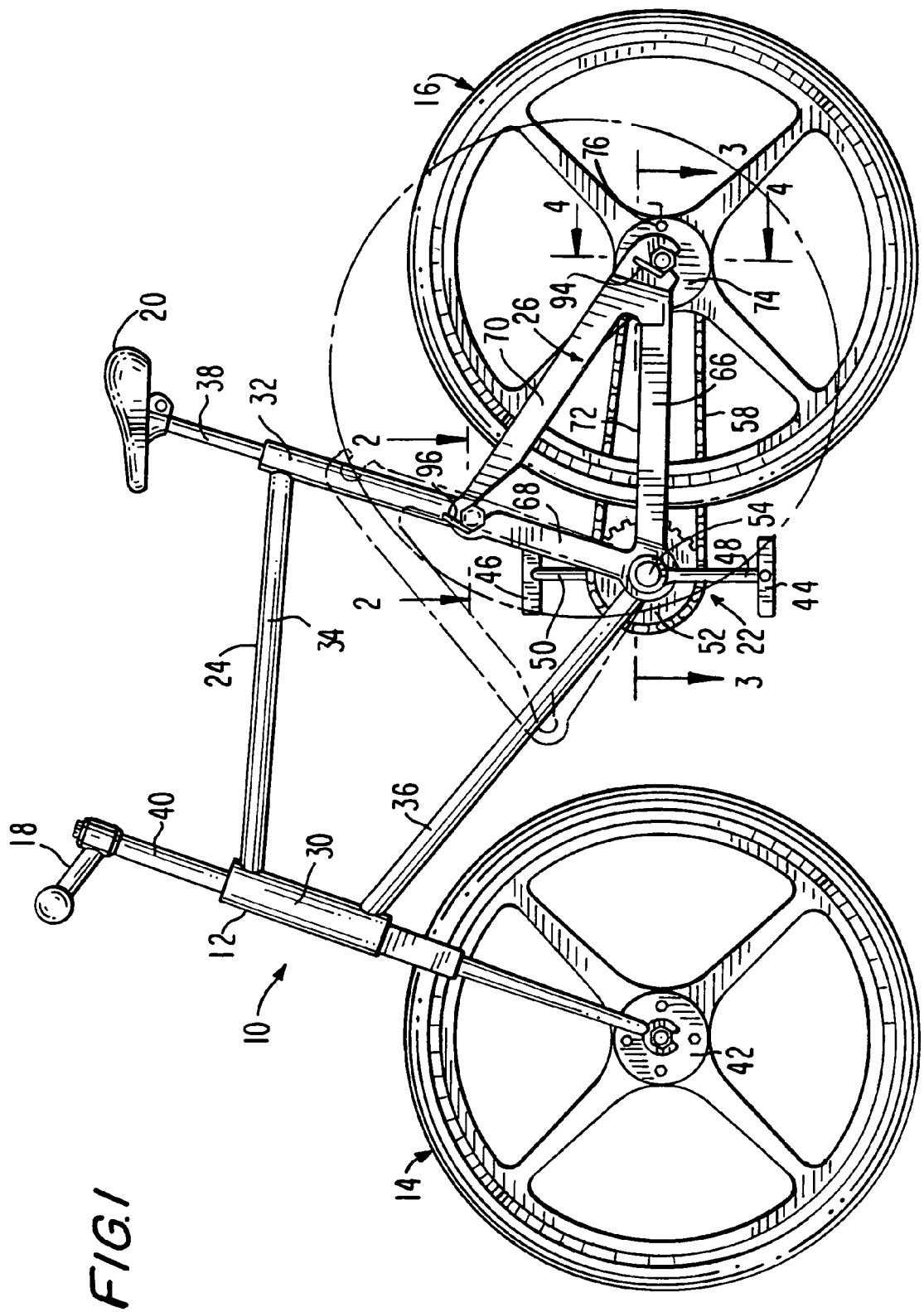
FIG. 1 is a side elevational view of a bicycle having a frame in accordance with this invention.

Referring to FIG. 1, a bicycle 10 includes a frame 12, a front wheel 14, a rear wheel 16, handlebars 18, a seat 20, and a foot pedal assembly 22. The frame includes a main frame support 24 and a pair of frame support arms 26, 28 mounted on the main support 24 and straddling the rear wheel 16, as best seen in FIG. 2.

The main support 24 includes a front tube 30 through which a steering post 40 is inserted. The handlebars 18 are mounted at one end of the post 40, and the opposite end of the post 40 is connected to a hub 42 of the front wheel. The post 40 is mounted for rotation in the front tube 30 and, hence, steering is achieved by turning the handlebars 18.

The main support 24 also includes a rear tube 32 through which a seat post 38 is inserted. The seat 20 is mounted at an upper end of the post 38 and is slid lengthwise thereof until a desired seat height is achieved. The main support 24 further includes upper tube 34 extending between upper regions of the front 30 and rear 32 tubes, and a lower tube 36 extending between lower regions of the front 30 and rear 32 tubes. In some bicycles, the upper tube 24 can be eliminated.

As best seen in FIG. 3, the front pedal assembly 22 includes a pair of foot pedals 44, 46 mounted on crank arms 48, 50 to turn a pedal gear 52 about a pedal axis 54. A gear changer 60 comprised of multiple gears is, as described below, operatively connected with the rear wheel 16. An endless drive chain 58 is trained about the pedal gear 52 and a selected gear 62 of the gear changer 60. A rider rotatably pushing the foot pedals about the pedal axis 54 causes the rear wheel 16 to rotate about a rear wheel axis 64 through the chain 58 at a rate determined by the gear ratio between the pedal gear 52 and the selected gear 62.

As previously mentioned, the support arms 26, 28 are mounted on the main frame support 24 and extend rearwardly thereof in straddling relation to the rear wheel 16. The support arms 26, 28 mount the rear wheel on the bicycle frame for rotation about the rear wheel axis 64 during use when the bicycle is in motion. As described below, by movement of at least one of the support arms, the rear wheel is removable from the bicycle frame for repair or replacement. Also, by movement of both support arms, the bicycle is folded up for compact storage.

As shown in FIG. 1, each support arm 26, 28 is generally shaped as an isosceles triangle having three bars 66, 68, 70 bounding an open triangular space 72 to reduce weight. Each corner between bars 66, 68 is pivotably connected for movement about the pedal axis 54 at a lower region of the rear tube 32. Each corner between bars 66, 70 is connected to the rear wheel 16 at rear wheel axis 64. Each corner between bars 68, 70 is connected to the rear tube 32 at an upper region above the pivotable connection at the pedal axis 54.

As shown in FIG. 3, the rear wheel 16 includes a tire 80 mounted on a rim 78 having a central hub 74 which is connected by a plurality of fasteners 76 to a circular flange 82 of a tubular housing 84 extending along the rear wheel axis 64. An axle 86 extends through the housing 84 and is connected at its opposite axial ends to the support arms 26, 28. Bearings 88, 90 assist in journaling the axle 86. The gear changer 60 is exteriorly mounted on the housing 84. A disk brake 92 is likewise exteriorly mounted on the housing 84. As described so far, the brake 92, changer 60, housing 84, bearings 88, 90, together with the illustrated nuts and washers, constitute a drive mechanism.

Figure 7:
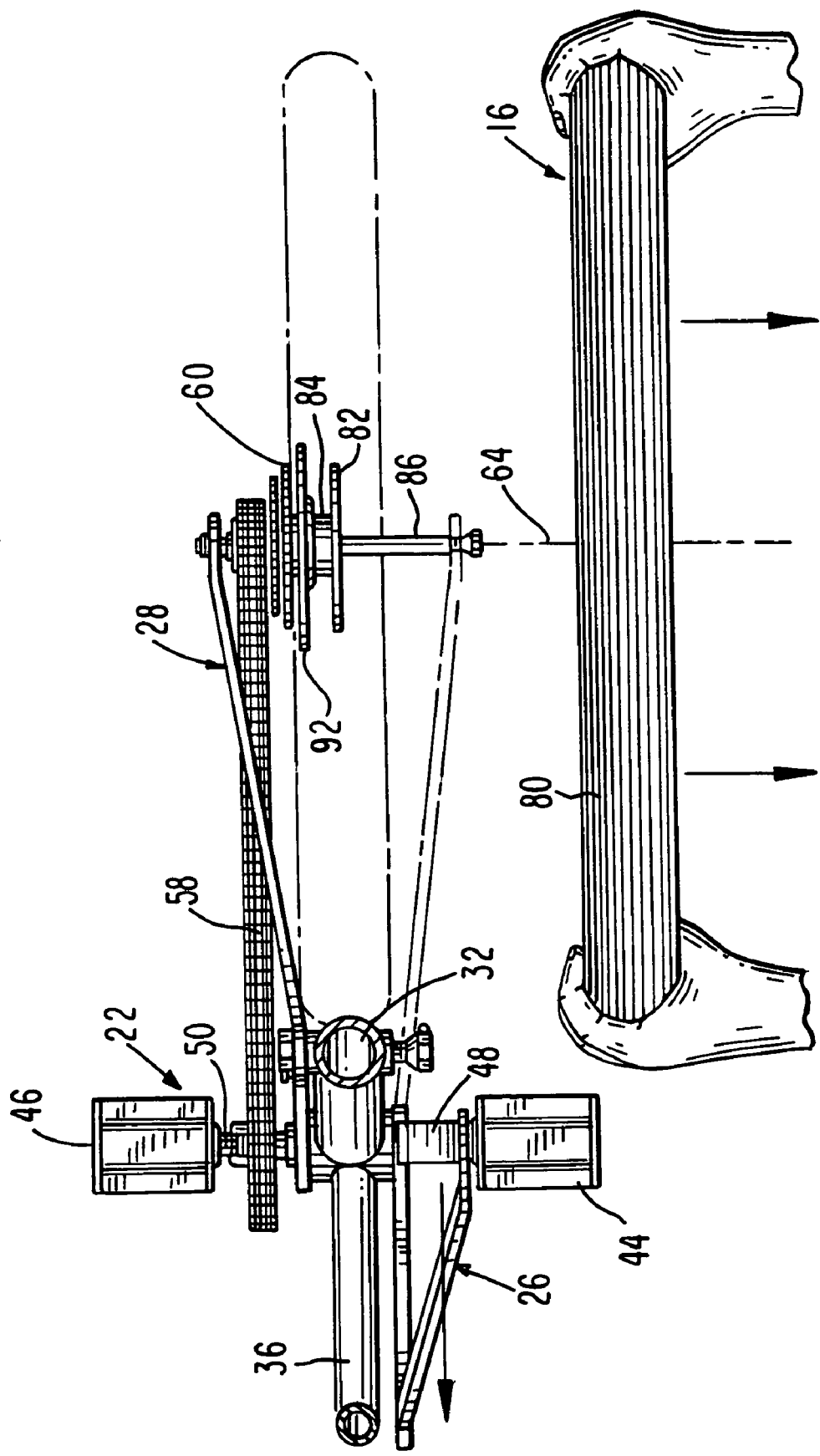
FIG. 7 is a sectional view taken on line 7—7 of FIG. 6.

A quick-release fastener 94, as best seen in FIGS. 4–5, is employed to detachably connect the arm 26 to the axle 86. Another quick-release fastener 96, as best seen in FIG. 2, is employed to detachably connect the arm 26 to the rear tube 32. Upon release by the fasteners 94, 96, the arm 26 is free to be pivoted in the counterclockwise direction depicted by arrow A in FIG. 6 about the pedal axis 54 until the arm 26 no longer overlaps the rear wheel. Thereupon, the fasteners 76 are removed to release the rear wheel from the drive mechanism. The rear wheel can now be axially removed from the axle 86 along the axis 64, as depicted in FIG. 7. The drive mechanism remains in place and is not removed together with the rear wheel. The rear wheel can now be repaired and/or replaced.

Mounting the repaired or a new rear wheel is achieved by reversing the above procedure. The rear wheel is axially returned to the axle 86, the fasteners 76 reconnect the hub 74 to the flange 82, the arm 26 is pivoted clockwise opposite to the arrow A, and the fasteners 94, 96 are reengaged.

In order to stow the bicycle in a folded configuration, both arms 26, 28 are pivoted about the pedal axis 54 in the direction of arrow A, as shown by dashed lines in FIG. 1. Before this is done, however, the fasteners 96 on both sides of the rear tube 32 are operated to release the arms 26, 28. As the arms are pivoted, the rear wheel 16 jointly moves with them. Thus, the bicycle has been folded from its initial state in which the front and rear wheels are aligned, one directly behind the other, to a folded state in which the rear wheel is elevated and closer to the front wheel.

It will be understood that each of the elements described above, or two or more together, also may find a useful application in other types of constructions differing from the types described above.

For example, each support arm need not be directly connected to the main frame support at the rear tube 32. Each support arm could be connected through a suspension to the main frame support. The suspension could be a shock absorber connected to another location on the main frame support, for example, the lower tube 36.

The invention herein need not be limited to the use of two support arms as described above, and could also be implemented as a single support arm 28 on which the drive mechanism is mounted. In other words, in some applications, the support arm 26 can be eliminated. The single support arm 28 need not be movable and, in some cases, may be rigid with the frame. The rear wheel is axially removable from the single support arm 28 whether movable or rigid.

Another advantageous feature of this invention resides in the feature that the front wheel and the rear wheel can be identical, and that a single spare can be used to replace either the front or rear wheels. In a conventional bicycle, the front and rear wheels are different and cannot be interchanged.

While the invention has been illustrated and described as embodied in a foldable bicycle frame with axial rear wheel removal, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed is:

1. A frame for a bicycle having front and rear wheels, comprising:
   a) a main frame support on which the front wheel is mounted; and
   b) a pair of frame support arms mounted on the main frame support and straddling the rear wheel to support the rear wheel in a use position for rotation about a rear wheel axis during bicycle motion, at least one of the frame support arms extending over the rear wheel to the rear wheel axis during bicycle motion and being pivoted to a remote position away from the rear wheel axis to enable removal of the rear wheel in a direction axially of the rear wheel axis when the bicycle is not in motion.

2. The frame of claim 1, wherein said at least one frame support arm is pivotably mounted on the main frame support about a pivot axis parallel to the rear wheel axis.

3. The frame of claim 2, and a drive mounted on the main frame support, the drive including a pair of foot pedals rotatable about the pivot axis to rotate the rear wheel.

4. The frame of claim 2, wherein the main frame support includes an elongated seat support, and wherein said at least one frame support arm is mounted at two locations lengthwise spaced apart along the seat support.

5. The frame of claim 1, wherein each frame support arm has a generally triangular configuration.

6. The frame of claim 1, wherein the frame support arms are independently pivotably mounted on the main frame support.

7. The frame of claim 1, wherein both frame support arms are simultaneously pivotably movable to position the rear wheel closer to the front wheel for compact storage when the bicycle is not in motion.

8. The frame of claim 1, and a drive including a drive mechanism mounted on the other of the frame support arms, the drive mechanism remaining on the other of the frame support arms after the axial removal of the rear wheel.

9. The frame of claim 8, wherein the drive mechanism includes a gear changer, and wherein the drive includes a front pedal assembly rotatable about a pedal axis, and a chain connected between the front pedal assembly and the gear changer.

10. The frame of claim 8, wherein the drive mechanism includes a braking assembly.

11. The frame of claim 8, wherein the drive mechanism includes an axle extending between the frame support arms, a casing surrounding the axle, and a hub connected to a rim of the rear wheel.

12. The frame of claim 1, and a handlebar assembly operatively connected to the front wheel and mounted for turning movement on the main frame support to steer the front wheel.

13. The frame of claim 1, wherein said at least one frame support arm is mounted on the main frame support with a quick release fastener.

14. A bicycle, comprising:
a) front and rear wheels;
b) a main frame support on which the front wheel is mounted; and
c) a pair of frame support arms mounted on the main frame support and straddling the rear wheel to support the rear wheel in a use position for rotation about a rear wheel axis during bicycle motion, at least one of the frame support arms extending over the rear wheel to the rear wheel axis during bicycle motion and being pivoted to a remote position away from the rear wheel axis to enable removal of the rear wheel in a direction axially of the rear wheel axis when the bicycle is not in motion.

15. The bicycle of claim 14, wherein the rear wheel is replaceable and identical with the front wheel.

16. A frame for a bicycle having front and rear wheels, comprising:
a) a main frame support on which the front wheel is mounted; and
b) a frame support arm mounted on the main frame support and overlying the rear wheel to support the rear wheel in a use position for rotation about a rear wheel axis during bicycle motion, the rear wheel being axially removably mounted on the frame support arm to enable axial removal of the rear wheel away from the use position when the bicycle is not in motion.

17. The frame of claim 16, and a drive including a drive mechanism mounted on the frame support arm, the drive mechanism remaining on the frame support arm after the axial removal of the rear wheel.

* * * * *